Figure 1:
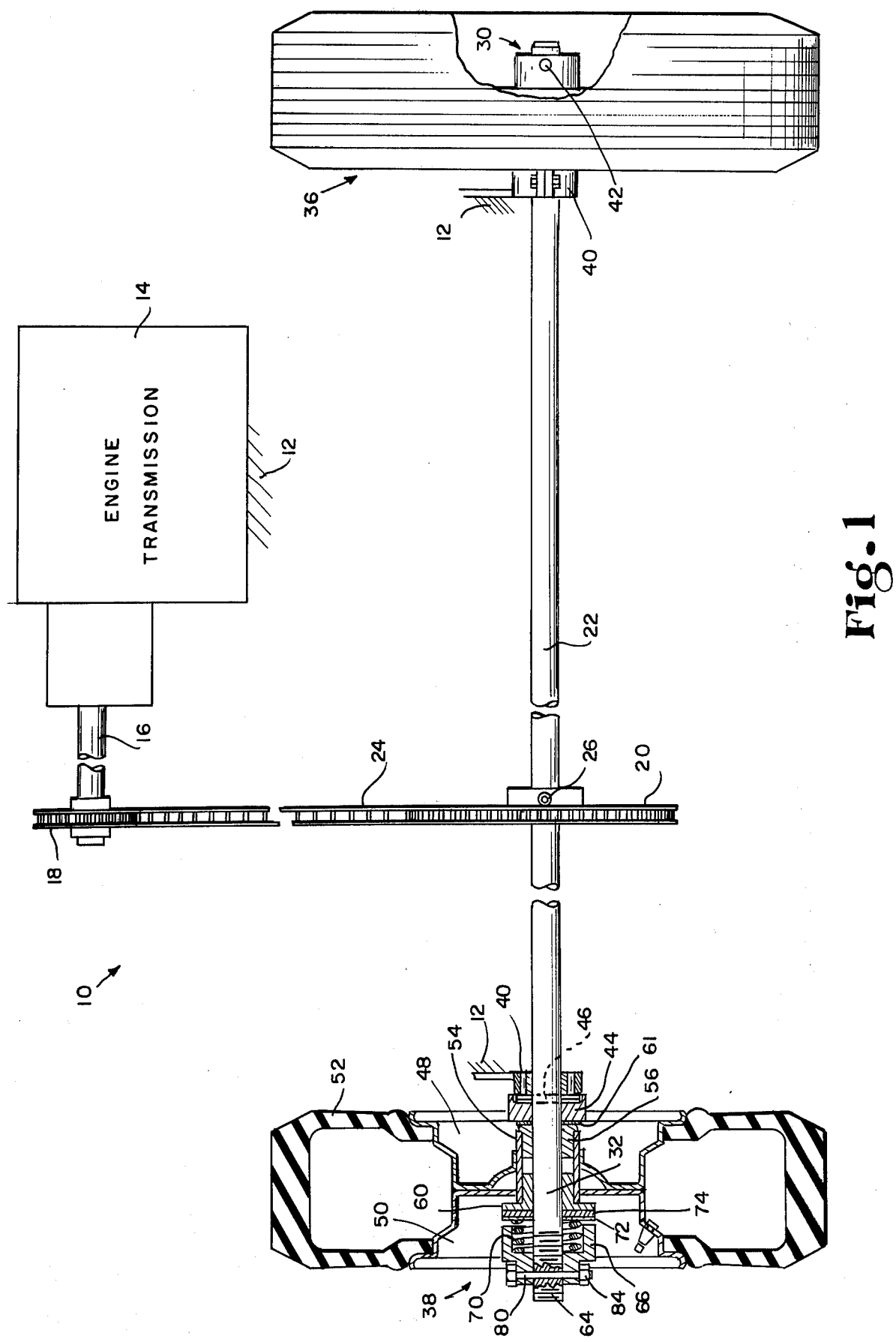

United States Patent [19]

Frazee et al.

[11] 4,023,640

[45] May 17, 1977

[54] WHEEL AND AXLE ASSEMBLY

[75] Inventors: Ray D. Frazee, Shelbyville; Charles Russell Ford, Indianapolis, both of Ind.

[73] Assignee: Carlisle Corporation, Cincinnati, Ohio

[22] Filed: Sept. 2, 1975

[21] Appl. No.: 609,487

[52] U.S. Cl. .................................. 180/76; 64/30 C
[51] Int. Cl.² .................................................. B60K 23/00
[58] Field of Search ............ 180/76; 64/30 R, 30 C, 64/15 C, 27 C; 74/650

[56] References Cited

UNITED STATES PATENTS

| | | | |
|---|---|---|---|
| 659,222 | 10/1900 | Foster | 180/76 |
| 1,181,053 | 4/1916 | Anderson | 64/30 R |
| 1,298,395 | 3/1919 | Proctor | 64/30 C |
| 1,377,112 | 5/1921 | Boylan | 64/30 X |
| 2,151,724 | 3/1939 | Wengel | 64/30 C |
| 2,226,759 | 12/1940 | Fitzner | 180/76 |
| 2,954,224 | 9/1960 | Schneider et al. | 64/30 C |
| 3,304,652 | 2/1967 | Donofrio | 180/76 |

FOREIGN PATENTS OR APPLICATIONS 11,249  1912  United Kingdom ................ 180/76

*Primary Examiner*—Joseph F. Peters, Jr.
*Assistant Examiner*—J. D. Rubenstein
*Attorney, Agent, or Firm*—Jenkins, Hanley & Coffey

[57] ABSTRACT

Wheel and axle assembly for small vehicles such as riding lawnmowers including a frame and an engine and transmission mounted upon the frame, the assembly comprising an axle having opposite first and second ends mounted upon the frame for rotation and drivingly connected to the output of the transmission. First and second wheels are provided for mounting, respectively, on the first and second axle ends. The first wheel is rigidly connected to the first axle end for rotation therewith such as by pinning or by key. A torque-limited driving connection is provided between the second wheel and the second axle end, the torque-limited driving connection permitting relative rotation between the second wheel and axle when a predetermined torque level is exceeded. This torque-limited device may include a frictional drive connection between the second wheel and the axle.

3 Claims, 2 Drawing Figures

WHEEL AND AXLE ASSEMBLY

The present invention relates to wheel and axle assemblies for small vehicles such as riding lawnmowers, and more particularly to the provision of such a wheel and axle assembly in which one of the two wheels is drivingly connected to the axle by a torque-limited driving connection means permitting relative rotation of that wheel and the axle when a predetermined torque level is exceeded.

Conventionally, for riding lawnmowers, the rear wheels are driven from the engine and transmission through a differential gear assembly which permits the mower to be steered as a result of relative rotation between the ground wheels. Such as assembly is relatively expensive. Further, it is now desired to have at least one of the two rear wheels fixed against rotation relative to the rear axle and the sprocket on the rear axle which is connected by a chain to the transmission. Thus, when a brake is applied to the output shaft of the transmission, the one rear wheel is necessarily stopped.

A differential action, however, is provided, in accordance with the present invention, by having the other rear wheel drivingly connected to the rear axle by means of a torque-limited drive connection such as, for instance, a slip clutch.

Reference is made to U.S. Pat. Nos. 849,474 issued Apr. 9, 1907; 906,017 issued Dec. 8, 1908; 2,566,724 issued Sept. 4, 1951; 2,832,452 issued Apr. 29, 1958; and 2,943,466 issued July 5, 1960. In addition, particular reference is made to U.S. Pat. Nos. 3,207,251 issued Sept. 21, 1965 and 3,289,800 issued Dec. 6, 1966, both showing friction-type differential assemblies replacing conventional gear differential assemblies. Both U.S. Pat. Nos. 3,207,251 and 3,289,800 show two piece axles, i.e., axles which are separated into two axles halves with one wheel rigidly connected to each half.

The present invention constitutes an improvement over the prior art in that one of the two wheels is rigidly connected to the one piece axle so that it necessarily rotates with the axle and with the drive sprocket arrangement on the axle while the other wheel slips on the axle or rotates relative to the axle when a predetermined torque, for instance, 35 foot pounds is exceeded.

One advantage of the wheel and axle assembly of the present invention involves the ease with which the slipping mechanism is applied to the wheel and axle assembly. The wheel is mounted on the axle and a spring is loaded by tightening a hub nut to provide the desired predetermined torque level. In other words, the act of assembling the wheel onto the axle also serves to adjust the torque level of the torque-limited driving connection. Further, in the illustrative and preferred embodiment, the torque-limited driving connection is provided external to the wheel such that the parts thereof can be replaced if necessary.

Other objects and features of the present invention will become apparent as this description progresses.

Figure 2:
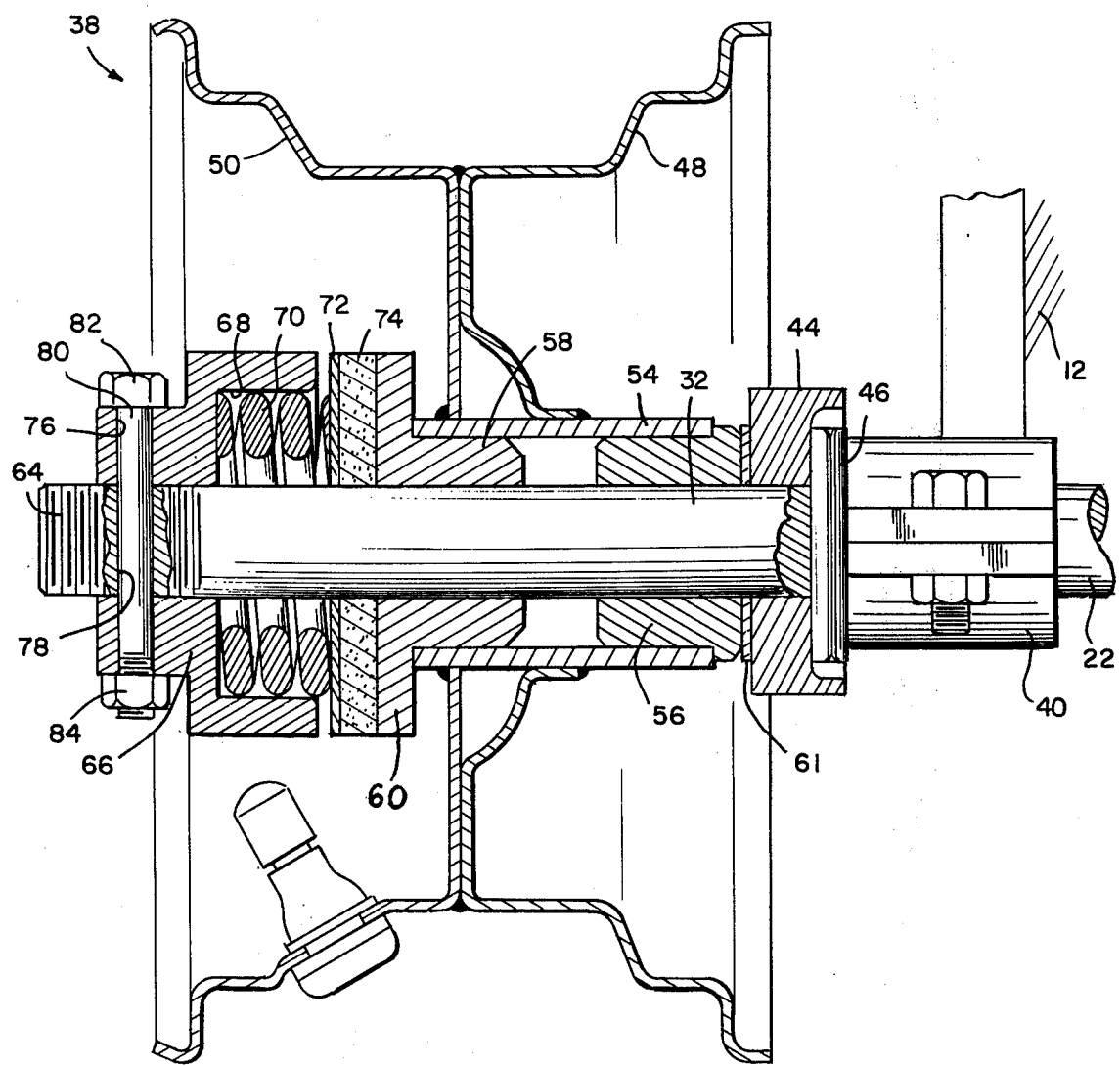

In the drawings:

FIG. 1 is a fragmentary, partially sectioned, view of the wheel and axle assembly portions of the vehicle frame and diagramatically showing the engine and transmission; and FIG. 2 is an enlarged view of the wheel and left-hand end of the axle.

The assembly 10 is shown comprising portions 12 of the vehicle frame upon which the engine and transmission 14 are mounted to provide an output shaft 16 upon which conventionally a sprocket 18 is mounted. A sprocket 20 is mounted upon the rear axle 22 which is journal mounted in the frame and the two sprockets are drivingly connected by means of a chain 24. The sprocket 20 is conventionally pinned as shown at 26 to the axle 22 for rotation therewith. The one-piece axle 22 has first and second opposite ends 30,32 upon which first and second wheels 36,38 are mounted. Bearings 40 are shown attached to the frame portions 12 for supporting the axle 22. A pin 42 is shown connecting the wheel 36 to the first axle end 30 so that that wheel 36 must always turn with the axle 22.

Referring to the second wheel 38, it will be seen that the illustrative wheel is provided by an inner wheel flange 48, an outer wheel flange 50, and a sleeve 54 all conventionally welded together to provide a rim upon which the rubber tire 52 is conventionally mounted. The wheel sleeve 54 has rigidly inserted therewithin an inner bearing 56 and an outer bearing 58. These two bearings are separated and axially spaced apart in the sleeve 54 as illustrated. Each bearing 56,58 has an outer end flange engaging the axially outer ends of the sleeve 54, and the bearing 58, in fact, has its flange 60 extending radially and peripherally outwardly to provide a clutch plate. This is the first clutch plate of the mechanism of the present invention.

There is a washer 61 between the axially inner bearing 56 and a stop 44 mounted on the axle 22 and illustratively pinned in position on that axle. This stop 44 may be against the bearing 40 which mounts the axle 22 on the frame and may be secured by pin 46.

The axially outer end portion of the second axle end 32 is threaded as indicated at 64, and a hub nut 66 is threaded upon that end portion. The hub nut 66 provides an axially inwardly facing bore 68 for receivig a spring 70. The spring 70 yieldably urges a washer 72 to which is attached a liner 74 of brake material against the axially outwardly facing surface of the flange 60. The washer 72 and the liner 74, illustratively, provide the second clutch plate of the mechanism.

The illustrative hub nut 66 is provided with a transaxially extending opening 76 therethrough or, if preferred, a plurality of peripherally spaced apart, transaxially extending openings 76. Then, the threaded portion 64 of the axle end 32 is provided with a transaxially extending opening 78 therethrough. When the hub nut 66 has been tightened to the desired position, a screw 80 having a head 82 may be inserted through one of the openings 76 and the axle opening 78 to lock the nut 66 against rotation relative to the axle. A nut 84 may be threaded on to the screw 80 as illustrated.

It will be appriciated that any number of techniques may be used to lock the nut 66 against rotation relative to the threaded portion 64. For instance, the axially outer end portion of the hub 66 may be provided with a plurality of peripherally spaced apart, radially extending slots for receiving a key or pin or the like which may extend through an opening in the threaded portion 64.

The washer 72 and its liner 74 are illustratively axially movable toward and away from the clutch plate 60, and the spring 70 urges the washer and its liner against the clutch plate 60. The hub nut 66, of course, provides hub means against which the spring 70 acts in moving the washer 72 toward the stop 44 on the axle 22.

The illustrative spring 70 is a die spring which is approximately two inches in outer diameter, and 1½ inches long in its uncompressed state. The spring, when compressed to approximately fifteen-sixteenths of an inch or just slightly less than an inch will produce a torque-resistance of approximately 35 foot pounds. That is, it takes approximately 56 pounds applied tangentially to the outer perimeter of tire 52 to cause the wheel 38 to slip relative to the axle 22. The brake material liner 74 may be an asbestos brake liner adhesively or otherwise secured to the washer 72. The cross section of the wire from which the illustrative spring 70 is made is oblong and approximately three sixteenths inch by seven-sixteenths inch. The ends of the spring 70 are ground flat to lie in planes perpendicular to the axis of the axle 22 as illustrated.

The assembly illustrated in FIG. 2, therefore, provides a frictional driving connection between the second wheel 38 and the second axle end 32.

What is claimed is:

1. Wheel and axle assembly for a small vehicle such as a riding lawnmower including a frame and an engine mounted upon said frame, said assembly comprising an axle having opposite first and second ends, means for journal mounting said axle for rotation on said frame, means for drivingly connected said engine to said axle, first and second wheels for mounting, respectively, on said first and second axle ends, in which the improvement comprises means for rigidly connecting said first wheel to said first axle end for rotation therewith, and means for providing a torque-limited driving connection between said second wheel and said second axle end, said torque-limited connecting means permitting relative rotation between said second wheel and said axle when a predetermined torque level is exceeded, said torque-limited connecting means including a first clutch plate concentrically connected to said second wheel for rotation therewith, a second clutch plate concentrically mounted on said second axle end for rotation therewith, and spring means for yieldably urging said plates into engagement, said second wheel including a rigidly fixed sleeve, said sleeve having a pair of axially and rigidly spaced apart bearings fixed in said sleeve and journal mounted on said second axle end, one of said bearings having a radially outwardly extending peripheral flange providing said first clutch plate, means providing a stop on said second axle end, the other of said bearings being against said stop, said second clutch plate being axially movable toward and away from said first clutch plate, said spring means being disposed to urge said second clutch plate toward said stop and against said first clutch plate, and means for providing a hub against which said spring means acts yieldably to urge said plates into engagement.

2. The improvement of claim 1 in which said second axle end has a threaded outer end portion, said hub means being threaded onto said outer end portion selectively to load said spring means to establish said predetermined torque.

3. The improvement of claim 2 including means for locking said hub means on said threaded outer end portion against movement from a selected position.

* * * * *